(12) United States Patent
Krysinski et al.

(10) Patent No.: US 6,607,161 B1
(45) Date of Patent: Aug. 19, 2003

(54) CONVERTIBLE AIRCRAFT WITH TILTING ROTORS

(75) Inventors: Tomasz Krysinski, Marseilles (FR);
Rogelio Ferrer, Marseilles (FR);
Thomas Manfredotti, Aix-en-Provence (FR); Eric Magre, Vitrolles (FR);
Jean-Marc Klein, Bouc Bel Air (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/070,629

(22) PCT Filed: Sep. 13, 2000

(86) PCT No.: PCT/FR00/02527

§ 371 (c)(1),
(2), (4) Date: Jun. 14, 2002

(87) PCT Pub. No.: WO01/19673

PCT Pub. Date: Mar. 22, 2001

(30) Foreign Application Priority Data

Sep. 14, 1999 (FR) .............................................. 99 11471

(51) Int. Cl.[7] .............................................. B64C 27/28
(52) U.S. Cl. ......................... 244/7 A; 244/7 C; 244/56; 244/75 A
(58) Field of Search ................................. 244/7 A, 7 R, 244/7 C, 1 N, 6, 56, 66, 75 A

(56) References Cited

U.S. PATENT DOCUMENTS

| 3,059,876 | A | * | 10/1962 | Platt ............................ 244/7 C |
| 3,107,882 | A | | 10/1963 | Matteson et al. |
| 3,592,412 | A | * | 7/1971 | Glatfelter .................... 244/7 A |
| 3,666,209 | A | | 5/1972 | Taylor |
| 5,054,716 | A | | 10/1991 | Wilson |
| 5,094,412 | A | | 3/1992 | Narramore |
| 5,096,140 | A | | 3/1992 | Dornier et al. |
| 5,405,105 | A | | 4/1995 | Kress |
| 5,961,067 | A | * | 10/1999 | Hall et al. ................... 244/1 N |
| 6,260,793 | B1 | | 7/2001 | Balayn et al. |
| 6,276,633 | B1 | | 8/2001 | Balayn et al. |
| 6,328,256 | B1 | * | 12/2001 | Ryan et al. ................. 244/7 R |
| 2002/0060268 | A1 | * | 5/2002 | Smith et al. .................. 37/305 |

FOREIGN PATENT DOCUMENTS

DE        3935925 A1 * 5/1991    ........... B64C/13/16

* cited by examiner

*Primary Examiner*—Peter M. Poon
*Assistant Examiner*—Gabriel S. Sukman
(74) *Attorney, Agent, or Firm*—Sturm & Fix LLP

(57) ABSTRACT

Improving convertible aircraft of the aforementioned type mainly in terms of the active control of vibrations, while at the same time avoiding the addition of significant additional masses for essentially countering the excitations caused by the rotors and, secondarily, of making such an aircraft easier to control in terms of roll in airplane mode. In this secondary objective, these improvements aim to allow simplifications to the maneuvering and command means for controlling the aircraft in terms of roll in airplane mode and preferably, at the same time, a simplification of the command and maneuvering means performing the functions of augmenting lift and reducing offsetting power. The invention also relates to improvements made to the convertible aircraft of the aforementioned type to give them the ability to land in airplane mode (without converting beforehand from airplane configuration to helicopter configuration). This possibility makes it possible to reduce the critical nature of the rotor tilt mechanisms in that landing remains possible without damage to the aircraft, whatever the position of the rotors. Furthermore, if both engines fail in airplane mode it is advantageous, particularly from the safety point of view, to be able to make a descent in airplane mode and in gliding flight and to land without having to tilt the rotors into helicopter mode before setting down, hence reducing the workload on the crew.

20 Claims, 4 Drawing Sheets

Figure 1:
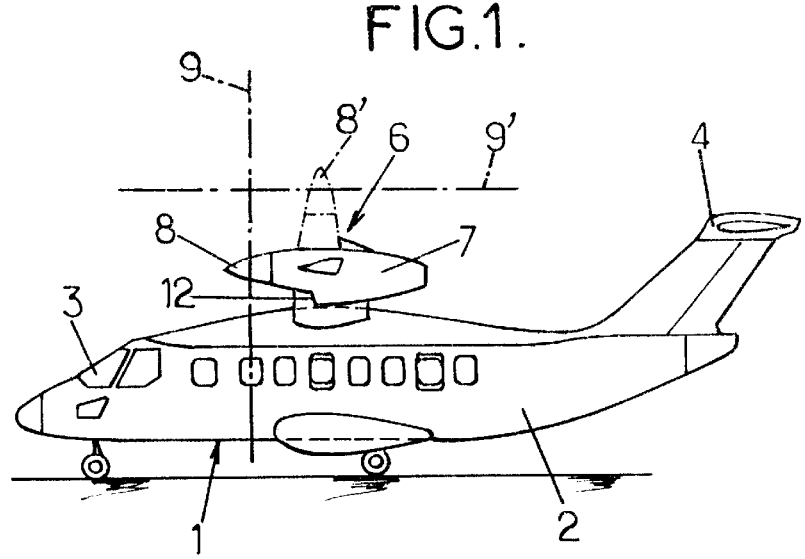

FIG.6.
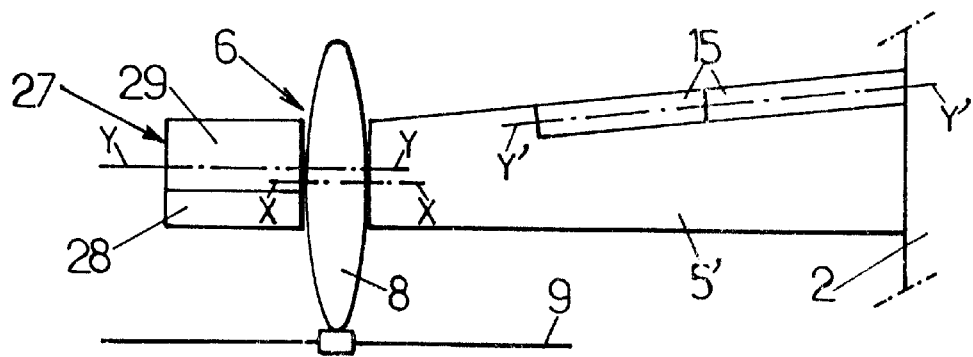
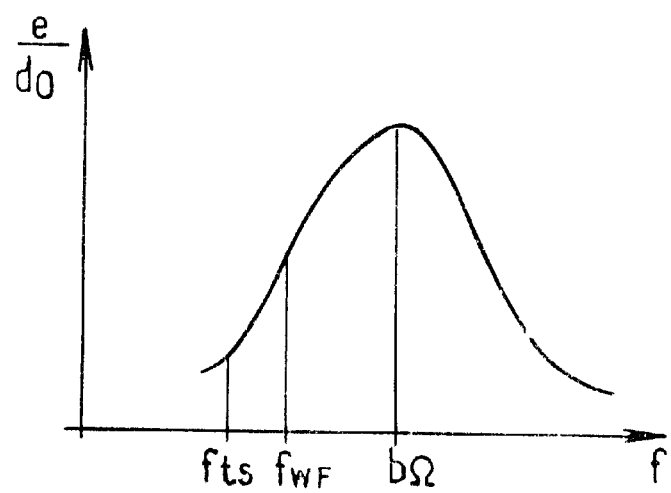
FIG.7.

CONVERTIBLE AIRCRAFT WITH TILTING ROTORS

The invention relates to improvements made to convertible tilt-rotor aircraft which can travel in airplane mode and in helicopter mode, and of the type comprising at least one fuselage, at least one empennage with at least one stabilizer, a fixed wing structure comprising at least two wings extending laterally on each side of said fuselage and, in helicopter mode, a rotary wing structure comprising at least two rotors, each of which is supported and driven in rotation by a respective one of two drive nacelles each supported by a respective one of the two fixed wings extending from the fuselage as far as the corresponding nacelle, each rotor being mounted so that it can tilt with at least one front part, which supports said rotor, of the corresponding nacelle on the corresponding fixed wing and about an axis of tilt which is roughly transversal with respect to the fuselage, so as to switch between helicopter mode and airplane mode, in which mode the rotors act as propellers.

As is known, these convertible aircraft can operate in helicopter mode or configuration, particularly for landings and take-offs, during which the rotors rotate above the fixed wings, about axes that are roughly vertical so as to provide the aircraft with lift, and in airplane mode or configuration, in which the rotors are tilted with respect to the fixed wings so as to operate as propellers.

Each rotor has its shaft connected by a respective transmission to a respective engine, the transmission and the engine being housed in the corresponding nacelle supported by the corresponding fixed wing, an interconnecting shaft connecting the two transmissions, so that the two rotors can be driven in rotation by either one of the two engines, should the other engine fail.

U.S. Pat. No. 5,054,716 describes a first example of a convertible aircraft of this type, in which each of the rotors, together with its operating means, the corresponding engine and the corresponding transmission, constitutes a tilting assembly housed, with the exception of the rotor blades and hub, in a nacelle mounted so that the entire thing can pivot, cantilever fashion at the tip of a corresponding fixed wing.

An architecture such as this has numerous disadvantages, mentioned in patent application FR 99 03735, which describes another architecture of a convertible aircraft of this type, overcoming the aforementioned drawbacks and in which each transmission comprises a front reduction gear assembly, driving the rotor in rotation, and a rear reduction gear assembly engaged with the corresponding front reduction gear assembly and connected to the corresponding engine, and to the interconnecting shaft connecting the two transmissions. Each of the two nacelles is articulated and comprises a front part, mounted so that it can tilt about the axis of tilting on a fixed rear nacelle part fixed to the corresponding fixed wing and in which rear nacelle part the corresponding engine and at least part of the rear reduction gear assembly of the corresponding transmission are housed. The front reduction gear assembly and the corresponding rotor shaft are housed in the tilting front nacelle part and are mounted so that they can tilt with said front part with respect to said rear part and said corresponding wing.

Whatever their architecture—nacelles which tilt in full with the rotors, or articulated nacelles only the front parts of which tilt with the rotors with respect to the fixed wings— the convertible aircrafts of the aforementioned type present, in terms of vibration control, new problems which are far removed from those presented by helicopters. Specifically, the special architecture of convertible aircraft, with rotors and possibly engines that can tilt at the wing tips, makes it very difficult to filter vibrations by inserting anti-resonant elements as is done on helicopters.

By contrast, the use of vibration filtration systems using resonators or force generators driven by computers is known, but these systems generally involve spring-mass assemblies which are very penalizing in terms of weight.

Furthermore, in a convertible aircraft of the aforementioned type, roll control in airplane mode is normally provided by the use of orientable command and/or control surfaces each mounted to pivot about an axis substantially transversal to the aircraft, along the trailing edge of each of the fixed wings, and these orientable surfaces are also used to provide the aircraft with additional lift at low speed in airplane mode and to reduce the offsetting power of the wing in helicopter mode.

As roll control requires swift dynamics, each fixed wing has a relatively high number of such command and/or control surfaces along its trailing edge, and these orientable surfaces need to be able to be commanded by a great many activators and may be connected by complex mechanical links allowing, in particular, negative turns (upward) and asymmetric turns of these surfaces across the two wings, while at the same time limiting the risk of a runaway roll situation associated with the asymmetric turnings of these orientable surfaces which are known as flaperons because they can perform the functions of flaps and of ailerons, and therefore of lift-augmenting and warping control surfaces. U.S. Pat. No. 5,094,412 describes means of complex structure and complex control of such flaperons, also known as elevons, for a convertible aircraft according to the aforementioned U.S. Pat. No. 5,054,716.

The problem underlying the invention is that of improving convertible aircraft of the aforementioned type mainly in terms of the active control of vibrations, while at the same time avoiding the addition of significant additional masses for essentially countering the excitations caused by the rotors and, secondarily, of making such an aircraft easier to control in terms of roll in airplane mode.

In this secondary objective, these improvements aim to allow simplifications to the maneuvering and command means for controlling the aircraft in terms of roll in airplane mode and preferably, at the same time, a simplification of the command and maneuvering means performing the functions of augmenting lift and reducing offsetting power.

The invention also relates to improvements made to the convertible aircraft of the aforementioned type to give them the ability to land in airplane mode (without converting beforehand from airplane configuration to helicopter configuration). This possibility makes it possible to reduce the critical nature of the rotor tilt mechanisms in that landing remains possible, without damage to the aircraft, whatever the position of the rotors.

Furthermore, if both engines fail in airplane mode, it is advantageous, particularly from the safety point of view, to be able to make a descent in airplane mode and in gliding flight and to land without having to tilt the rotors into helicopter mode before setting down, hence reducing the workload on the crew.

However, the ability of a convertible to land in airplane mode is usually accompanied by a reduction in the size of the rotors, and sometimes in the replacement of the rotors with airscrews, as is the case in a third architecture of convertible aircraft known as the tilt wing aircraft, in which the aircraft wings pivot in full or in part about the axis of tilting with the nacelles that they support.

Now, reducing the size of the rotors has known consequences on the performance of an aircraft of the VTOL (Vertical Take-Off and Landing) type. These consequences are, in particular:

- degradation in the performance in hovering flight and at low speed, because the lift effectiveness of a rotor decreases rapidly with its size, thus eliminating the apparent gain achieved by effacing the wings under the rotors in embodiments with wings tilting with the nacelles and rotors, for example,
- increasing the external noise, which is associated with the increase in the load at the rotor disks (maximum mass divided by the area of the rotor disks), and
- degradation in the ability to windmill or autorotate which is associated with the increase in the load at the rotor disks.

The second problem underlying the invention is that of overcoming these drawbacks by the use of rotors of relatively large size, sized to optimize performance in hovering flight, with cyclic pitch control (which does not generally exist in tilt wing embodiments) and collective pitch control for good convertible-aircraft behavior in helicopter mode and during conversion, such large-sized rotors being tiltable with respect to fixed wings, so as to keep the advantages inherent in this type of wing structure, particularly so as to limit the drag in forward flight in helicopter mode (to improve performance on take-off in the event of an engine failure) with respect to a completely or partially tilting wing, and which allows good behavior during conversion. In addition, the wing structure of the convertible aircraft is configured to allow landing in airplane mode in spite of the presence of relatively large-sized rotors.

With the effect of solving the first problem underlying the invention and as explained hereinabove, the convertible aircraft according to the invention is characterized in that each fixed wing is extended, substantially in the direction of its span and toward the outboard side of the corresponding nacelle with respect to the fuselage, by at least one outboard wing portion, at least part of which pivots, independently of the rotor and of at least the front part of the corresponding nacelle, about an axis of articulation substantially transversal to the aircraft and constitutes an orientable command and/or control surface, whose pivotings about the axis of articulation are commanded, at least at a frequency of the order of $Kb\Omega$, where b and $\Omega$ are, respectively, the number of blades and the frequency of rotation of each rotor, and K is a whole number at least equal to 1, by at least one driven actuator so as to at least attenuate, at the fuselage, the fixed wings and the empennage(s) and stabilizer(s), at least the vibrations generated naturally by the rotation of each rotor.

Aside from controlling the vibrations generated by the rotors in normal operation, or natural vibrations inherent in the rotors and generated in rotating axis, the orientable and outboard wing tip command and/or control surfaces can be used to provide active control of the vibrations produced by either or both of the phenomena of whirl flutter and tail shake, the former of which, it will be recalled, is an aeroelastic instability arising from the looping between a rotor and the corresponding wing at high speed in airplane mode, while the latter corresponds to vibrations of the tail boom or of the rear parts of the nacelles and of the fuselage of a convertible aircraft, said tail boom or rear parts of nacelles and of the fuselage being excited by the wash of the rotors at frequencies of a few hertz and often close to 4 Hz. This active control makes it possible to reduce the stiffness, and therefore the mass, of each wing for a given maximum speed and/or to increase the maximum speed of the aircraft.

To this end, the pivoting of the orientable command and/or control surface is transiently commanded by the driven actuator at a frequency below $Kb\Omega$ and of the order of 4 to 6 Hz so as to counter the whirl flutter phenomenon, or of the order of a few Hz, generally of the order of 4 Hz, so as to counter the tail shake phenomenon.

When integrated into an active anti-vibration system, the outboard orientable command and/or control surfaces, arranged as elevons operating as little driven ailerons or active aerodynamic flaps, situated at the wing tips, generate aerodynamic forces which are used to counter the excitations generated by the rotors, avoiding the addition of additional masses.

A convertible aircraft of the type set out hereinabove is thus equipped with a self-adaptive anti-vibration system based on the outboard orientable command and/or control surfaces or outboard elevons operating as driven ailerons and/or as active aerodynamic flaps at the wing tips, and the turn angle, and therefore incidence of which is driven by at least one computer commanding at least one maneuvering actuator, first actuator being controlled at the frequency $b\Omega$, any second actuator being controlled at the frequency $2\,b\Omega$, any third actuator being controlled at the frequency $3\,b\Omega$, etc., so as to generate aerodynamic forces directed against the excitation forces of the rotors and thus making it possible to minimize the level of vibration in the fuselage, the empennage(s) and stabilizer(s), the fixed wings and any fixed rear parts of the aircraft nacelles that there might be, this anti-vibration system being particularly well suited to operation in airplane mode.

To this end, and advantageously, the actuator is an excitation ram slaved in movement, maneuvering the orientable command and/or control surface against the action of static and dynamic tuning elastic means and driven automatically by at least one active and self-adaptive vibration control computer which drives the ram on the basis of signals received from sensors, particularly load, accelerometer and gyrometer sensors, arranged at least at predetermined points on the fuselage and/or the rotors and/or the empennage(s) and stabilizer(s), in particular.

Advantageously, the elastic means absorb the static forces of the orientable surface and, in dynamic terms, their stiffness is coupled to the inertia of the moving assembly comprising at least said orientable surface and the moving parts of the ram so as to create a second-order resonant system, the resonant frequency of the moving assembly being tuned to the excitation frequency of the ram, which makes it possible to considerably reduce the control forces, and therefore the size of the ram.

In practice, the moving assembly has a resonant frequency $$f = \frac{1}{2\pi}\sqrt{\frac{k}{I}},$$

where k is the stiffness of the elastic means (25) and I is the inertia of the moving assembly and the excitation frequency of the ram is normally tuned to $b\Omega$ such that $b\Omega$ is substantially equal to f.

When the two rotors of the convertible aircraft are three-bladed rotors, and given the nominal rotational speed of the rotors, the excitation frequency of the ram is normally tuned substantially to a frequency of about 20 Hz.

In addition, in order to counter the phenomena of tail shake and whirl flutter, the excitation frequency of the ram is advantageously transiently tuned to a frequency of about 4 Hz to about 6 Hz when said sensors detect signals that bear witness to at least one of these two phenomena, then, once the phenomenon has been attenuated or has disappeared, the excitation frequency of the ram is tuned back to substantially the frequency bΩ.

Such an outboard orientable surface (outboard of a nacelle) can also receive a differential command, with respect to the orientable surface outboard of the other nacelle, and operate as an aileron commanding warping and allowing the aircraft to be controlled in terms of roll in airplane mode, with the required swift dynamics, the roll command afforded by the outboard orientable surfaces thus being decoupled from the lift-augmenting and lift reduction functions that can be carried out, with slower dynamics, by other inboard (between the nacelles and the fuselage) orientable command and/or control surfaces on the trailing edges of the fixed wings.

In this alternative form, the excitation ram of each elevon or outboard orientable surface is also driveable by pilot controls (actuated by the crew of the convertible aircraft), particularly warp controls. In this case, command of the excitation ram by the vibration control computer is neutralized while the excitation ram is being commanded by the pilot controls.

EP-0 416 590 and U.S. Pat. No. 3,666,209 disclose convertible aircraft the wing structure of which comprises aerodynamic lift-creating and pivoting surfaces outboard (along the wing span) of drive nacelles and of a fixed inboard wing portion. However, each drive nacelle pivots with a wing part about an axis of pivoting, which means that these convertibles have the third of the aforementioned convertible aircraft architectures known as the tilt wing architecture and their pivoting and outboard aerodynamic surfaces are intended to correct variations in attitude of the aircraft about its center of gravity and are therefore control surfaces activated by flight controls situated in the cockpit. Each flight control or pilot control allows the aircraft to be moved about one of its axes of roll, pitch and yaw.

Depending on the case, these moving surfaces can be likened to ailerons allowing warping (rotation about the axis of roll) in flight in airplane mode or a movement of yaw in vertical flight in helicopter mode.

According to the present invention, the pivoting parts of the outboard wing structure portions are, unlike in EP-0 416 590 and U.S. Pat. No. 3,666,209, elevons, the functions of which have been defined hereinabove and which are self-driven to minimize, in the structure of the aircraft, vibrations which are at least of the aforementioned three types: vibrations generated by the rotors in normal operation, and by the phenomena of tail shake and whirl flutter.

The outboard orientable surfaces according to the invention can also be used to reduce the rates of descent of the aircraft with the rotors windmilling or autorotating (in the event of a failure of the two engines), contributing to the lift of the aircraft if these orientable outboard surfaces are directed into the wind.

Furthermore, the presence of such outboard orientable surfaces has the impact of increasing the aerodynamic elongation of the wings and therefore of reducing the induced drag, thus improving performance in airplane mode in a climb, in cruising flight and in fineness, hence giving a lower rate of descent in unpowered flight (engine failure).

By analogy with the embodiment of the conventional ailerons and flaps, the pivoting part or orientable command and/or control surface of each outboard wing structure portion may be a pivoting trailing edge elevon of a fixed and outboard wing portion, which thus constitutes the tip of the corresponding fixed wing, beyond the corresponding nacelle. However, in a second embodiment, each outboard wing structure portion may be an outboard wing part that is entirely pivoting about the axis of articulation so that the entirety of the wing structure part outboard of a nacelle can be arranged as an elevon pivoting about its axis of articulation with respect to the adjacent nacelle and with respect to the corresponding fixed wing.

With a view to solving the second problem underlying the invention and as is set out hereinabove, the convertible aircraft according to the invention is such that its fixed wings are high wings secured to the upper part of the fuselage, to keep the nacelles and therefore the rotors at a sufficient height, guaranteeing a minimum ground clearance of the rotors to allow landing in airplane mode, this ground clearance being increased and/or the diameter of the rotors being increased if the high wings are raised with respect to the upper part of the fuselage.

However, advantageously in addition, the fixed high wings have an upward dihedral angle (positive dihedral angle) between the fuselage and the nacelles, which, at the same time, makes it possible to increase the ground clearance and/or the diameter of the rotors still further and makes it possible to limit the drag penalty due to the raised position of the fixed wings above the fuselage.

Fixed wings which are raised with respect to the fuselage and with an upward dihedral angle undeniably improve the landing capability with the rotors in airplane mode.

Outboard of the nacelles, the outboard wing structure portions comprising the outboard orientable command and/or control surfaces, or arranged as such outboard orientable surfaces, may also have a positive (upward) or zero (substantially horizontal) dihedral angle, but advantageously, in order to at least partially compensate for any disadvantageous aerodynamic effects of the positive dihedral angle of the fixed wings, the outboard wing structure portions may have a negative (downward) dihedral angle so that the fixed wing structure of the aircraft is substantially in the form of gull wings.

It should be noted that the characteristics relating to the raised fixed high wings with an upward dihedral angle and which are possibly extended, outboard of the nacelles, by outboard wing structure portions with a positive, zero or negative dihedral angle, can be used on a convertible aircraft of the type set out hereinabove independently of the other characteristics set out hereinabove and relating to the structure, the arrangement, the maneuvering and the control of the outboard orientable command and/or control surfaces of the convertible aircraft, and vice versa. Specifically, such outboard orientable surfaces may equip the wing tips of a fixed wing structure of a convertible aircraft, the fixed wings of which are not high wings nor are they raised nor do they have a positive dihedral angle.

Figure 3:
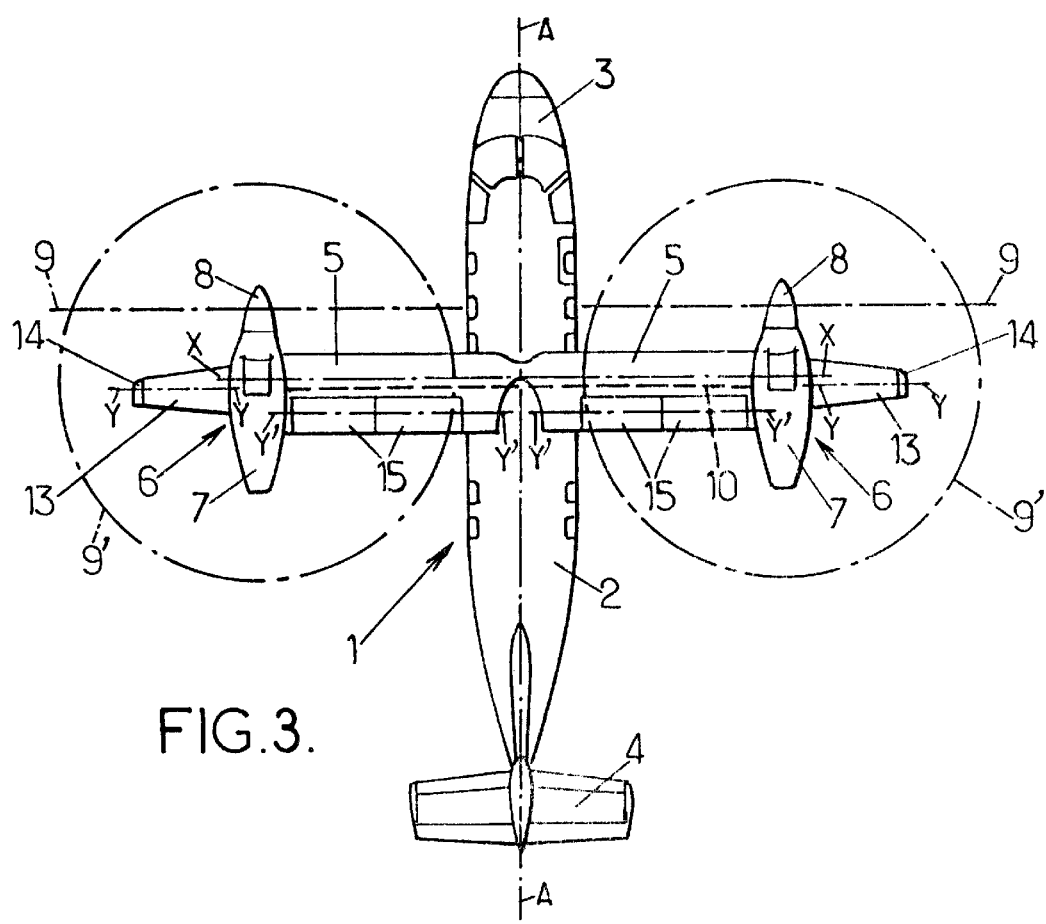
Figure 2:
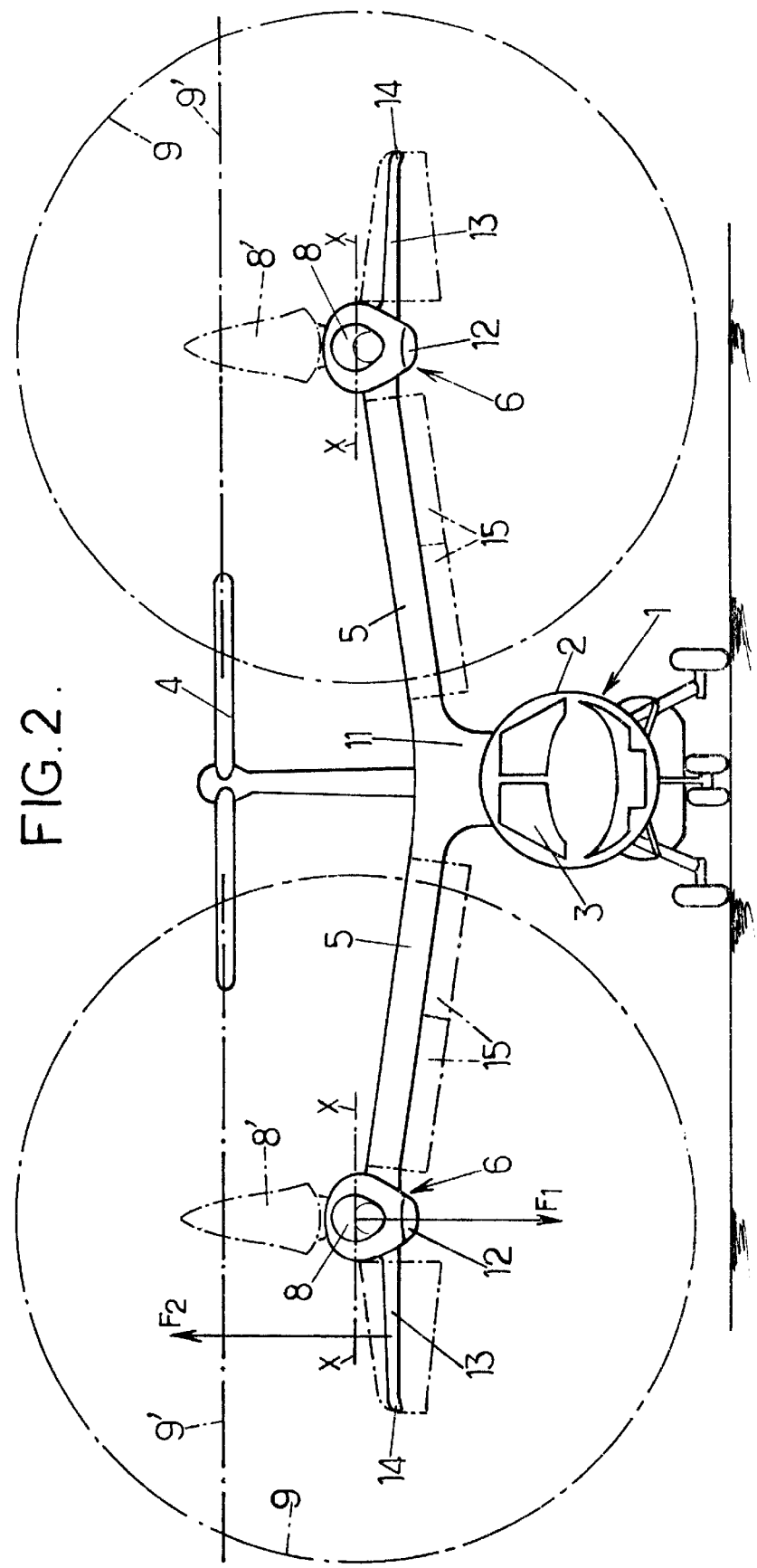
Figure 4:
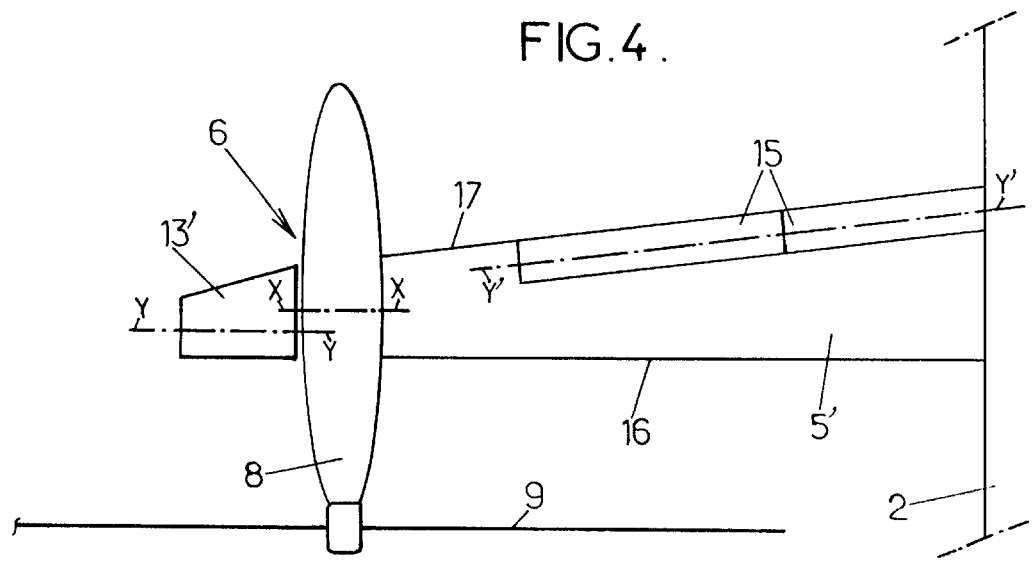
Figure 5:
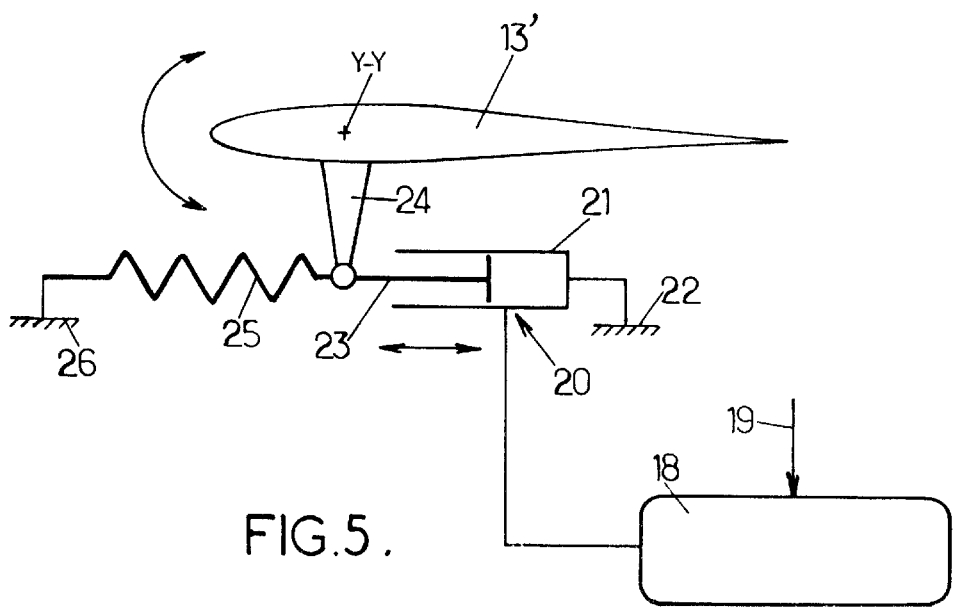

The invention will be better understood, and other features and advantages of the invention will become apparent from the description given hereinbelow with no implied limitation of some exemplary embodiments which are described with reference to the appended drawings in which:

FIGS. 1, 2 and 3 are schematic views respectively in side elevation, front elevation and plan view, of a first embodiment of a convertible aircraft equipped with a gull wing fixed wing structure and with outboard wing structure portions arranged as outboard wing parts which pivot entirely about axes of articulation and therefore constitute elevons operating as driven ailerons and/or as active aerodynamic flaps, FIG. 4 is a schematic partial plan view of a second exemplary embodiment, in airplane mode, FIG. 5 is a schematic sectional view of the outboard orientable surface of the example of FIG. 4 and of its maneuvering and control means, FIG. 6 is an alternative form of embodiment of FIG. 4, and FIG. 7 is a curve depicting, as a function of frequency, the amplification of the amplitude of the movements of the elevon with respect to the amplitude of the excitations of the control ram, in a mechanical system according to FIG. 5.

The convertible aircraft 1 of FIGS. 1 to 3 comprises a fuselage 2, of the airplane fuselage type, with a cockpit 3 at the front and a T-shaped empennage 4 with stabilizer(s) at the rear, and two fixed high wings 5, in this example with zero backsweep and constant chord (rectangular in plan view), extending, in the conventional way, laterally on each side of the fuselage 2, each fixed wing 5 supporting, at its outboard end along its wing span on the opposite side to the fuselage 2, an articulated drive nacelle 6 fixed by its rear part 7 to the corresponding wing 5. As an alternative, the empennage 4 may have some other geometric configuration, for example in the form of a cross or of a V, or of twin stabilizers, or some other configuration. The convertible aircraft may be equipped with one or more empennages 4 equipped with one or more stabilizer(s).

Each nacelle 6 comprises a streamlined front part 8, substantially in the shape of an ogive, and mounted so that it can tilt, with respect to the fixed rear part 7 of the nacelle 6, and therefore with respect to the corresponding wing 5, about an axis of tilting X—X which is transversal to the fuselage 2 and more particularly perpendicular to the longitudinal plane of symmetry passing through the longitudinal axis A—A of the aircraft 1.

When the aircraft is in this aerodynamic configuration, the axis of tilting X—X is parallel to the plane perpendicular to the longitudinal axis A—A of the aircraft 1 and containing the straight lines that pass through the centers of aerodynamic pressure of the wings 5, the axis of tilting X—X being slightly behind the lines of the centers of pressure situated a distance from the leading edge of the wings 5 which is about 25% of the value of the chord of the wings 5, toward their trailing edge.

On the tilting front part 8 of each nacelle 6, a rotor, for example a three-bladed or four-bladed rotor, depicted diagrammatically in the form of the rotor disk 9, is mounted so that it rotates about its axis and also tilts about the axis X—X with the corresponding nacelle front part 8, each rotor 9 having a shaft connected, for its rotational drive, by a transmission to a turbine engine unit fixed in the fixed rear part 7 of the corresponding nacelle 6, in an arrangement described more specifically in FR 99 03735, to which reference can be made for further specifics on that subject, and which is incorporated into this text by reference.

To drive the two rotors 9 when one or other of the turbine engine units is defective, and regardless of the inclination of the rotors 9 and of the tilting front parts 8 of the nacelles 6 about the axis of tilting X—X, the two transmissions are joined together by an interconnecting shaft depicted diagrammatically as 10 in FIG. 3. Reference may also be made to FR 99 03735 for further details on the various possible connections of the interconnecting shaft 10 to the two transmissions of the rotors 9. The shaft 10 essentially consists of two straight parts, each extending between the fuselage 2 and a respective one of the nacelles 6, along the entire span of the corresponding fixed wing 5, this shaft part 10 being substantially parallel to the plane perpendicular to the longitudinal axis A—A and passing through the axis of tilting X—X, but offset with respect to that plane, for example toward the rear of the wings 5 (see FIG. 3), the two straight parts of the interconnecting shaft 10 being coupled together on the top of the fuselage 2, and coupled to an accessories drive unit housed in a raising box structure 11 via which the fixed high wings 5 are secured to the upper part of the fuselage 2, being raised with respect to this fuselage 2.

In order for each rotor 9, tilting with the tilting front part 8 of the corresponding nacelle 6, to be able to be driven in rotation about its axis by the turbine engine unit housed in the fixed rear part 7 of this nacelle 6 or by the interconnecting shaft 10 driven off the other turbine engine unit housed in the nacelle 6 of the other wing 5, each transmission, which has a free wheel to neutralize the differences in rotational speed of the engines, comprises a transmission front part or front reduction gear assembly, which drives the shaft of the rotor 9 and is mounted to tilt with it about the axis of tilting X—X, inside the tilting front part 8 of the nacelle 6, the front reduction gear assembly remaining in constant mesh with a rear transmission part or rear reduction gear assembly which does not tilt, in constant mesh with a power take-off at the corresponding end of the interconnecting shaft 10 and with an output shaft of the corresponding turbine engine unit. The rear reduction gear assembly which does not tilt, occupies a fixed position with respect to the turbine engine unit, to the rear part 7 of the corresponding nacelle 6, to the interconnecting shaft 10 and therefore to the wings 5, and is partially housed in the fixed rear part 7 of the nacelle 6 and possibly in at least one of the streamlined connectors or fairings between the fixed rear nacelle part 7 and the corresponding wing 5.

The convertible aircraft 1 is thus equipped with two tilt rotors each of which can be tilted between a helicopter configuration in which the rotors are labeled 9' on the front nacelle parts which are labeled 8', and in which each rotor 9' is driven about a substantially vertical axis of rotation for operation of the aircraft in helicopter mode, and an airplane configuration in which each rotor labeled as 9 (in FIGS. 1 to 3) at the front of a nacelle front part labeled as 8 behaves as a propeller driven in rotation about an axis substantially aligned with the direction of flight, for operation of the aircraft in airplane mode.

In practice, the tilting front part 8 of each nacelle 6 tilts via a central rear portion between two front lateral extensions of the fixed rear part 7 of this nacelle 6, as described in FR 99 03956.

To ensure good supply of air to the engine, fixed in this fixed rear part 7, the latter has a lower air intake 12 which is fixed and which opens forward under the tilting front part 8 of the nacelle 6.

The fixed wings 5, raised at 11 on the fuselage 2, also have a positive dihedral angle (see FIG. 2), that is to say that each of them is raised upward, with respect to their raised connection 11 to the fuselage 2, on the side of their end supporting the nacelle 6. The nacelles 6, and therefore the rotors 9, are thus raised up above the ground so that sufficient ground clearance remains between the rotors 9 and the ground, even when the rotors 9 are of relatively large diameter, to allow the aircraft 1 to land with the rotors 9 in airplane configuration, particularly in the event of failure of both engines, the rotors 9 then windmilling or autorotating, declutched from the engines, but the aircraft can also be landed in airplane mode with rotors 9 driven by the engines or stationary.

Adopting raised wings 5 with a positive dihedral angle therefore allows the aircraft 1 to be landed without damage regardless of the position of the rotors 9, and this possibility reduces the criticality of the systems used for tilting the rotors 9. In the event of failure of the two engines in airplane mode, the aircraft can descend in gliding flight and land without having to tilt the rotors 9 into helicopter mode prior to landing.

Note that the space freed up in the raising box structure 11 above the fuselage 2 for raising the wings 5 allows additional accessories such as alternators, hydraulic pumps, etc., driven by the intermediate gearbox housed in this raising box 11 to be housed and provides the interconnection of the two parts of the interconnecting shaft 10. This makes incorporating the engine and the rear transmission part into each nacelle 6 simpler and makes it possible to reduce the size of the nacelles 6.

The positive dihedral angle of the wings 5 not only makes it possible to raise the rotors 9 high enough to allow landing in airplane mode, but also makes it possible to use rotors 9 of sufficiently large size that they can be sized to optimize performance in hovering flight, with cyclic and collective pitch control for good behavior in helicopter mode and when converting between the airplane and helicopter modes.

Furthermore, the penalty in terms of drag due to the presence of the raising box 11 allowing the raised position of the wings 5 above the fuselage 2 is limited by the use of wings 5 that have a positive dihedral angle.

These advantages stemming from wings 5 with a positive dihedral angle add to those afforded by the fixed wings, namely the limitation of drag in forward flight in helicopter mode by comparison with a partially or fully tilting wing, and the obtaining of good behavior during conversion, because the wings 5 do not stall. This limitation in drag in forward flight in helicopter mode makes it possible to improve performance on take-off in the event of an engine failure.

According to another feature specific to the convertible aircraft 1 of the invention, the aircraft 1 wing structure comprises, substantially in the continuation of each wing 5, along its span and outboard of the corresponding nacelle 6, that is to say on the opposite to the fuselage 2, an outboard wing structure portion 13, at least part of which pivots about an axis of articulation Y—Y substantially transversal to the aircraft 1, and preferably contained in a plane perpendicular to the longitudinal axis A—A of the aircraft 1, that is to say in a plane parallel to the axis of tilting X—X of the rotors 9 with at least the front parts 8 of the nacelles 6 and the front parts of the transmissions.

In the example of FIGS. 1 to 3, each outboard wing structure portion 13 is an outboard wing part that pivots in its entirety about the axis of articulation Y—Y. Each of the two outboard wing parts 13, of substantially trapezoidal shape in plane view (see FIG. 3), and the straight leading and trailing edges of which converge toward one another laterally toward the outboard end and are connected by a small tip fairing 14, constitutes a command and/or control surface which is orientable, and the pivotings of each about its axis of articulation Y—Y are controlled by an actuator, such as a ram, driven by a computer which may be incorporated into the pilot control computers. These orientable surfaces 13 perform the functions of driven ailerons and/or of active aerodynamic flaps, situated at the tips of the wings 5, beyond the nacelles 6, and therefore constitute evelons which can operate as pitch control surfaces and as warp control surfaces. The axis of articulation Y—Y makes it possible to control the incidence of each elevon 13, and its maneuvering ram (not depicted) is slaved in movement and driven constantly by the computer to control the turning of the elevon 13.

Operated as ailerons, the orientable elevons 13, situated outboard of the nacelles 6, allow the aircraft 1 to be controlled in terms of roll in airplane mode, this roll control, which demands swift dynamic response, thus being decoupled from the lift-augmenting and lift-reducing functions which are performed by orientable command and/or control surfaces mounted along the trailing edges of the fixed wings 5 between the nacelles 6 and the fuselage 2 and which constitute inboard ailerons and/or flaps 15, in low number, pivoting about axes of articulation Y'—Y' also substantially transversal with respect to the fuselage 2, for example two ailerons and/or flaps 15 per wing 5 (see FIGS. 2 and 3).

As a result, this lower number of inboard orientable surfaces 15 can be controlled by a lower number of slow dynamic actuators, which are therefore simple and economical. In addition, the structure of the inboard orientable surfaces 15 can be simplified, and their number may even be reduced to one surface 15 per wing 5, the need for negative turning (orientation upward) disappearing as does the need for asymmetric turning between the two wings 5. In this alternative form and under these conditions, a mechanical link between the two orientable surfaces 15 makes it possible in a simple way to cover the risk of the aircraft 1 running away in terms of roll in response to asymmetric turning of the orientable surfaces 15, operating simply as flaps, but also being able, more generally, to operate as elevons.

In addition to the control of the roll of the aircraft 1 in airplane mode, which is secondary, the outboard orientable surfaces 13 (or outboard elevons 13) are used primarily as automatically driven active aerodynamic flaps, to provide active vibration control, particularly control of natural vibrations inherent to the rotors 9 and generated in rotating axis, and vibrations associated with the phenomena known as tail shake and whirl flutter, the latter being essentially an aeroelastic instability arising from the coupling between the rotors 9 and the wings 5 at high speed in airplane mode. This active control, described more specifically hereinbelow with reference to FIGS. 4 and 5, consists in developing, as depicted schematically in the left-hand part of FIG. 2, aerodynamic forces F2 on the elevons 13 to counter the excitations F1 brought about by the rotors 9 in particular, the maneuvering ram of each elevon 13 constantly and automatically driving the fluctuations of incidence of the latter, which generates aerodynamic forces by receiving orders from the computer slaving the ram in movement and calculating the command orders from, for example, signals from accelerometer and/or gyrometer sensors and for load sensors situated at various points on the convertible such as determined points on the fuselage 2 and/or on the rotors 9 and/or on the empennage(s) and stabilizer(s) 4. Each outboard elevon 13 may be driven in incidence about its axis of articulation Y—Y against the action of elastic means which return the elevon 13 to a neutral position in the absence of loading on the part of the maneuvering ram, these elastic means furthermore having two functions, which are those of absorbing the static forces of the elevon 13, so as to relieve the corresponding maneuvering ram, and so that dynamically the stiffness of the elastic means, coupled with the inertia of the moving parts (essentially the elevon 13 and the moving parts of its maneuvering ram) creates a resonant second-order system the resonant frequency of the moving parts being tuned to the excitation frequency making it possible to considerably reduce the control forces and therefore the size of the maneuvering ram.

This then produces an active self-driven and self-adapting anti vibration system based on the injection of additional aerodynamic forces introduced by the control of the outboard elevons 13 to minimize the vibrations in all the non-pivoting parts of the aircraft 1 especially the fuselage 2, the empennage(s) and stabilizer(s) 4, the fixed wings 5 and the non-pivoting rear parts 7 of the nacelles 6.

The use of the outboard elevons 13 for active vibration control therefore makes it possible to reduce the stiffness, and hence the mass, of the wings 5 for a given maximum speed and/or to increase this maximum speed of the aircraft 1.

The outboard elevons 13 also make it possible, when driven as flaps, and in the event of a failure of both engines, to reduce the rate of descent of the aircraft, with the two rotors 9 wind milling or autorotating, by contributing to the lift of the aircraft 1 in airplane mode, if the elevons 13 are directed into the wind.

Finally, through their presence practically at the tips of the wings 5, the elevons 13 increase the aerodynamic elongation of the wing structure, and this reduces the induced drag and therefore improves performance in airplane mode in a climb, in cruising flight and in fineness (so that the rate of descent in unpowered flight is reduced).

As depicted in FIG. 2, the outboard elevons 13 have a slightly negative (downward) dihedral angle which is accentuated at their tip fairing 14, therefore in the opposite direction to the dihedral angle of the wings 5, to compensate for any effects that this positive dihedral angle of the wings 5 might have.

It will also be understood that the use of partially tilting nacelles 6 (with an engine and rear transmission part housed in the fixed rear part 7 of the nacelle and the rotor 9 tilting with the front part of the transmission and the front part 8 of the nacelle 6), allow simple structural integration of the outboard elevons 13 to the nacelles 6.

As an alternative, the elevons or outboard wing structure portions 13 may have a zero dihedral angle (may be substantially horizontal) or may also have a positive dihedral angle, substantially in the continuation of that of the wings 5, but these outboard wing structure surfaces 13 are preferably given a slight negative dihedral angle (see FIG. 2) giving the main wing structure the appearance of gull wings.

In the schematic alternative form depicted partially in FIG. 4, it is possible again to see each fixed wing 5' fixed in a high and raised position with a positive dihedral angle on the upper part of the fuselage 2 and, in this example, with the shape in plan view of a right trapezium with a leading edge 16 with zero backsweep and a trailing edge 17 with negative backsweep and equipped with two inboard elevons 15, and which at its outboard end supports a nacelle 6, at least the front part 8 of which tilts with a rotor 9. An outboard elevon 13', which, in plan view, has the shape of a right trapezium, the leading and trailing edges of which substantially continue the respective leading and trailing edges 16 and 17 of the wing 5' is mounted so that it can pivot in its entirety, outboard of the nacelle 6, about its axis of articulation Y—Y. In this alternative form, the axis of articulation Y'—Y' of the inboard elevons 15 is inclined with respect to the plane transversal to the aircraft passing through the axis of articulation Y—Y of the outboard elevon 13', whereas in the example of FIGS. 1 to 3, the axes of articulation Y'—Y' of the inboard elevons 15 and those Y—Y of the outboard elevons 13 are in parallel transverse planes.

FIG. 5 schematically depicts the control of the orientation of each outboard elevon 13' of FIG. 4 about its axis of articulation Y—Y. To produce a self-adaptive antivibration system based on the outboard elevons 13', the turn angle of each outboard elevon 13' is driven by a computer 18 receiving at 19 signals from accelerometers, gyrometers and load sensors arranged at given points particularly on the fuselage 2, the rotors 9 and the empennage(s) and stabilizer(s) 4 of the aircraft. The computer 18 drives an excitation ram 20, which is a linear ram, slaved in movement, the cylinder 21 of which bears against a fixed point 22 of the fixed rear part 7, for example, of the nearby nacelle 6, or on a fixed point 22 of the wing 5', while the piston and the rod 23 of the ram 20 drive a small lever 24 secured to the elevon 13' in rotation about the axis of articulation Y—Y and against the action of a static and dynamic tuning spring 25 also urging the lever 24 via one end and resting via its other end on a fixed point 26 of the structure of the nearby nacelle 6 or of the wing 5'. The back and forth linear movements of the ram rod 23, shown schematically by a double-headed arrow under the ram 20, are thus converted into back and forth rotations of the elevon 13' about its axis of articulation Y—Y in the direction of the curved double-headed arrow at the front of this elevon 13' in FIG. 5. Thus, the turn angle of the outboard elevon 13' driven by the computer 18 and the ram 20, makes it possible to generate aerodynamic forces (such as F2 in FIG. 2) directed against the excitation forces of the rotors 9 (such as F1 in FIG. 2). It is thus possible to minimize the level of vibration in the fuselage, the empennage(s) and stabilizer(s) and the fixed wings of the aircraft, particularly in airplane mode. Schematically, the excitations of the rotors 9 are countered by the lift on the outboard elevons 13' or 13 in the examples of FIGS. 1 to 4. As mentioned above, the spring 25 absorbs the static forces of the elevon 13' so as to relieve the ram 20 and, dynamically, the stiffness of the spring 25 coupled with the inertia of the moving assembly, comprising mainly the elevon 13' with its lever 24, the piston and the rod 23 of the ram 20 and the spring 25, creates a resonant second-order system the resonant frequency of this moving assembly being tuned to the excitation frequency of the ram 20, this making it possible to reduce the control forces delivered by the ram 20 and therefore the power and bulk thereof.

It is appropriate to note that the control of the ram 20 by the vibration control computer 18 is neutralized when the ram 20 is being controlled by the pilot controls, so as to drive the elevon 13 or 13' as a pitch control surface or warp control surface.

Thus, by way of example, an outboard elevon such as 13 or 13', but one which has a substantially rectangular shape in plan view, with a chord 0.56 m long and a span of 0.25 m, and which is driven with a turn angle amplitude of ±5° is enough to act against an excitation force of 1000 N, at the maximum speed of the aircraft in airplane mode of approximately 150 m/s, the estimated mass per elevon being about 2 kg.

To produce a good influence on the change in the level of vibration due to the dynamic forces, the outboard elevons 13 or 13' are produced in such a way that their center of gravity is forward of their center of rotation on the axis of articulation Y—Y, the center of rotation itself being positioned at their aerodynamic center of pressure, so as to avoid moments which are due to the aerodynamic force. This makes it possible to minimize the driving forces.

Each outboard wing structure portion, outboard of the nacelles 6, may be not completely an orientable surface but may, on the other hand, as depicted schematically in FIG. 6 which depicts an alternative form of FIG. 4, be an outboard wing structure portion 27 of which a front part, along its leading edge, is a fixed outboard wing portion 28, to the rear of which an orientable part 29 is mounted so that it can pivot about the axis of articulation Y—Y and constitute the orientable command and/or control surface operating as an aileron and/or as a flap, and therefore similar to the elevon 13 or 13' of the previous examples.

In the examples of FIGS. 1 to 3, 4 and 6, the outboard elevons 13, 13', 29 introduce into the fixed structure of the nacelles 6 or of the fixed wings 5 or 5', shear forces and bending moments, but little or no torsional moments, when their axis of articulation Y—Y passes substantially through the center of twist of the fixed wings 5 or 5'.

By offsetting the axis of articulation Y—Y of the elevons 13, 13', 29 forward or backward with respect to the center of twist of the fixed wings 5 or 5', the elevons can additionally introduce into the structure of the wings 5 or 5' torsional moments which may be necessary if the phenomenon of whirl flutter manifests itself, and in order to counter this phenomenon.

In all the exemplary embodiments, the elevons 13, 13' and 29 are therefore self-driven to attenuate, in the structure of the convertible, vibrations which are at least of the aforementioned types, mainly vibrations resulting from the phenomena of whirl flutter and tail shake and the vibrations generated by the rotors in normal operation.

As regards the whirl flutter phenomenon, it is understood that, if one of the rotors 9 of the convertible is moved away from its plane of rotation, for example under the effect of a gust of wind, the breakage of a wing element altering the stiffnesses of the wing, etc., parasitic variations in the angle of incidence of the blades of this rotor 9 occur and this introduces additional aerodynamic forces which excite this rotor 9 and sustain the movement. The corresponding fixed wing 5 or 5' is therefore deformed, and this may once again accentuate the movement of the rotor 9 with respect to its plane of rotation, and so on, so that if the stiffness of the wing 5 or 5' is not enough to dampen these movements and return the assembly to a position of equilibrium, the phenomenon diverges until the elements involved on the wing 5 or 5' and/or on the corresponding rotor 9 break.

In consequence, the movement of the wing 5 or 5' is an overall bending and torsional movement which results in particular in a predominant vertical movement of the wing 5 or 5'. This movement, and the vibrations it generates, are precisely the movement and the vibrations that the elevon 13, 13' or 27 is supposed to attenuate and then cancel out.

This phenomenon of instability corresponds to a frequency of the order of 4 to 6 Hz approximately.

As regards the vibrational phenomenon known as tail shake, this is a vibration of the rear parts 7 of the nacelles 6 and of the rear part of the fuselage 2 of a convertible aircraft, in which these rear parts are excited by the wash from the rotors 9, and these vibrations develop at frequencies of a few hertz and often close to 4 Hz.

As regards the vibrations generated by the rotors 9 in normal operation, or natural vibrations inherent to the rotors 9, which are generated in rotating axis, it is known that these vibrations are at three levels, namely $Kb\Omega$ and $(Kb\pm1)\Omega$ where b and $\Omega$ are, respectively, the number of blades and the rotational frequency of each rotor 9 and K is a whole number at least equal to 1. However, regardless of the nature of the excitation of the rotor (flapping or drag) and regardless of the level and position (with K=1, 2, 3, 4, . . . ) of the excitation frequency, the excitations in fixed plane of reference, in flapping up and down, bending and torsion, occur at frequencies $Kb\Omega$.

In other words, in fixed axis, that is to say at the fuselage 2 and at the empennage(s) and stabilizer(s) 4 and at the fixed wings 5 and 5' and the fixed rear parts 7 of the nacelles 6 of the convertible, only vibrations in $Kb\Omega$ are felt.

As the frequencies most disagreeable to man (and therefore to the passengers and crew) are the lower ones, the priority is given to at least attenuating, and if possible canceling vibrations at the frequency $b\Omega$ for K=1, particularly at the frequency $3\Omega$ when each of the two rotors 9 of the convertible is a three-bladed rotor. Given the nominal rotational speed of each rotor 9, which is the order of 400 rpm, $\Omega$ is of the order of 6 to 7 Hz, which means that excitation forces that have to be canceled out are at frequencies of the order of 18 to 21 Hz, namely about 20 Hz, which constitutes a relatively high driving frequency.

As the resonant frequency of the moving assembly of FIG. 5, essentially comprising the elevon 13' and its lever 24, the piston of the rod 23 of the ram 20 and the spring 25, is a frequency f such that $f=1/2\pi\sqrt{k/I}$ where k is the stiffness of the spring (25) and I is the inertia of this moving assembly, the latter is produced in such a way that its resonant frequency f is tuned by construction to the main frequency that is to be damped, $b\Omega$, namely about 20 Hz in the case of a three-bladed rotors 9.

First, the computer 18 operates the ram 20 in such a way that its excitation frequency is normally tuned to $b\Omega$ which is equal to f. This makes it possible to obtain the movement of the elevon 13, 13' or 29 with a minimum of force to be supplied by the ram 20. What happens is a mechanical system which oscillates at its resonant frequency requires a very small addition of energy in order to set it into motion. It is therefore possible to use a small-sized ram 20, which meets the desired goal of saving mass and volume in particular.

The elevon 13, 13' or 29 therefore has limited dimensions so as to have a low inertia, in order for it to be easy to move it at frequencies of the order of 20 Hz, which entails a system with good dynamics.

By way of example, an elevon which in plan view is rectangular, for a convertible aircraft each of the two rotors 9 of which has a diameter of about 9 to 10 m, with a distance of 12 to 15 m between the axes of the two rotors 9, is an elevon made of carbon fiber with a mass of 4 kg and an area in plan view of 0.25 $m^2$, for example, a chord length of 0.5 m and a span of 0.5 m, this elevon being set at a mean angle of incidence of 5°.

It is understood that this function of mainly damping the vibrations in $b\Omega$ can not in any way be performed by the inboard flaps (between the nacelles 6 and the fuselage 2) or by the tilting of an inboard wing part because, in both cases, the rotational inertia of these inboard elements is very high, because of their large size, dictated in particular by the chord of the wing and the thickness of the wing (in proportion to the chord) at this point, which means that it is not possible to achieve sufficiently high driving frequencies. In particular, the path band of the inboard flaps is too low, because it is merely of the order of 2 to 3 Hz.

Returning to the self-driven and self-adapting active anti-vibration system of FIG. 5, this system has the advantage that a dynamic amplification is put to good use so that the driving of the elevon 13' can be achieved with very small control forces on the ram 20, the moving assembly comprising the elevon 13' and its lever 24, the piston and the rod 23 of the ram 20 and the spring 25 already in itself, when operating as a passive mechanical system, providing a great deal of amplification depicted schematically by the bell shaped curve in FIG. 7, which represents the change, as a function of frequency f, of the ratio e/d0 of the amplitude of the movements of the elevon 13' to the amplitude of the excitations at the ram 20. This amplification ratio e/d0 is at a maximum for the resonant frequency of the moving assembly (13'-24-23-25) of FIG. 5, the construction of which is such that this natural frequency is tuned to the frequency $b\Omega$. The maximum effectiveness is thus obtained for this frequency $b\Omega$. This amplification ratio, which is of the order of 4 for example at the top of the curve in FIG. 7, is lower, but nonetheless always greater than 1, for the frequency fts, of the order of 4 Hz, at which the tail shake phenomenon occurs, and for the frequency fWF, lying substantially between 4 and 6 Hz and, for example, of the order of 5 Hz, at which the whirl flutter phenomenon occurs. It will be understood that the system of FIG. 5 can, with maximum effectiveness, counter just one excitation frequency at a time, in this instance the frequency $b\Omega$. However, although this system is designed to attenuate with the greatest effectiveness vibrations at the frequency $b\Omega$, excitations which occur at other frequencies such as fts and fWF are also attenuated, but not as effectively.

However, to attenuate and possibly eliminate the vibrations that result from phenomena of whirl flutter and tail shake when the sensors onboard the convertible detect the onset of these phenomena, the computer 18 transiently commands the excitation frequency of the ram 20 so that this frequency is no longer tuned to the normal operating frequency at $b\Omega$, but to a frequency from about 4 Hz to about 6 Hz, in the case of whirl flutter, or to a frequency of the order of 4 Hz in the case of tail shake, the computer 18 then setting the excitation frequency of the ram 20 back to the frequency $b\Omega$ as soon as the whirl flutter or tail shake phenomenon has been sufficiently attenuated or even eliminated, something that the computer 18 can determine from information received at 19 from the in-board sensors.

Likewise, when the rotational frequency $\Omega$ of the rotors 9 varies, something which is also detected by the on-board load, accelerometric and gyrometric sensors, the computer 18 can adjust the excitation frequency of the ram 20 to tune it once again to the new frequency $b\Omega$ thus obtained. The computer 18 thus allows adaptation to the variations, generally limited in amplitude, of the rotational frequencies of the rotors 9.

The elevons 13, 13', 29 are thus commanded at a frequency that is substantially tuned to the frequencies of the vibrational phenomena that are to be attenuated, or even eliminated, by the computer 18 receiving signals 19, identifying the vibrational regimes, from sensors mounted at various points on the convertible and sensitive to the excitation forces applied in particular to the fuselage 2 from the two rotor 9—elevon 13, 13' or 29 assemblies which are subjected to various aforementioned aeroelastic and vibrational excitations. In general, the load, accelerometric and gyrometric sensors informing the computer 18 may be arranged at any point on the convertible aircraft. The two elevons 13, 13' or 29 are driven together by the same computer 18 until a configuration is obtained which minimizes the measured level of vibration.

Arranging the elevons 13, 13' and 29 at the wing tips, that is to say in the direction of the span outboard of the nacelles 6 carried at the ends of the fixed wings 5 or 5' seems to be optimum for the following reasons:

the essential excitations come from the rotors 9, these themselves being at the ends of the fixed wings 5 or 5' which means that the closer the resultants of the lift of the elevons 13, 13' or 29 are to the excitation forces (so that there is therefore no resultant moment on the wings 5 or 5'), the easier these essential excitations are to counter, arranging the elevons 13, 13' or 29 outboard of the nacelles 6 makes it possible to avoid unfavorable interactions on the wings 5 or 5' themselves or with the control flaps 15 of these wings, whereas such interactions, particularly turbulent interference, would be induced on the flaps 15 by an elevon driven at high frequency and arranged inboard of the nacelles 6 (between the nacelles 6 and the fuselage 2), it is at the elevon 13, 13' or 29, outboard of a fixed wing 5 or 5' -nacelle 6 assembly, that the modal deformation of this assembly is the greatest; at constant load, it is therefore at this point that the effectiveness of a system involving an elevon such as 13' and a spring such as 25 in FIG. 5 is at its maximum; in other words, as the work of the external forces is equal to the product of the load and the displacement (or rotation) for angular variation, at constant load, the maximum effectiveness is obtained as a result of the deflections and/or dynamic rotations at the outboard end of the wing-nacelle assemblies.

It is thus possible to equip the convertible aircraft with active and self-adapting antivibration systems, offering optimum adaptation capability in flight in airplane mode, regardless of the mass, centering, structural dispersion and rotational speed conditions. This is because, from the signals from the acceleration, gyrometer and/or load sensors in the fuselage 2 and on the rotors 9, one or more computers such as 18 formulates (formulate) a command driving rams such as 20 which maneuver the outboard elevons such as 13, 13' or 29, which generate aerodynamic forces intended to counter the vibrations. The forces delivered by the elevons, maneuvered by the rams, are constantly adjusted according to the level of vibration, so that this level is minimized within the meaning of a given criterion, for example a least-squares or some other criterion.

Of course, the invention set out hereinabove is not restricted to convertible aircraft with articulated drive nacelles as described in FR 99 03735 and FR 99 03956, but also applies to convertible aircraft with drive nacelles which tilt in full with the rotors, as described in U.S. Pat. No. 5,054,716.

What is claimed is:

1. A method for the active control of the vibrations of a convertible tilt-rotor aircraft which can travel in airplane mode and in helicopter mode, and comprising at least one fuselage, at least one empennage with at least one stabilizer, a fixed wing structure comprising at least two wings extending laterally on each side of said fuselage and, in helicopter mode, a rotary wing structure comprising at least two rotors, each of which is supported and driven in rotation by a respective one of two drive nacelles each supported by a respective one of the two fixed wings extending from the fuselage as far as the corresponding nacelle, each rotor being mounted so that it can tilt with at least one front part, which supports said rotor, of the corresponding nacelle on the corresponding fixed wing and about an axis of tilt which is substantially transversal with respect to the fuselage, so as to switch between helicopter mode and airplane mode, in which mode the rotors act as propellers, each fixed wing being extended, substantially in the direction of its span and toward the outboard side of the corresponding nacelle with respect to the fuselage, by at least one outboard wing portion, at least part, of which pivots, independently of the rotor and of at least the front part of the corresponding nacelle, about an axis of articulation substantially transversal to the aircraft and constitutes an orientable surface which is at least one of a command surface and a control surface, whose pivotings about the axis of articulation are commanded, by at least one driven actuator, the method comprising the step of commanding the pivotings of said orientable surface at least at a frequency of the order of $Kb\Omega$, where b and $\Omega$ are, respectively, the number of blades and the frequency of rotation of each rotor, and K is a whole number at least equal to 1, so as to at least attenuate, at the fuselage, the fixed wings and the empennage and stabilizer, at least the vibrations generated naturally by the rotation of each rotor.

2. A convertible tilt-rotor aircraft which can travel in airplane mode and in helicopter mode, and comprising at least one fuselage, at least one empennage with at least one stabilizer, a fixed wing structure comprising at least two wings extending laterally on each side of said fuselage and, in helicopter mode, a rotary wing structure comprising at least two rotors, each of which is supported and driven in rotation by a respective one of two drive nacelles each supported by a respective one of the two fixed wings extending from the fuselage as far as the corresponding nacelle, each rotor being mounted so that it can tilt with at least one front part, which supports said rotor, of the corresponding nacelle on the corresponding fixed wing and about an axis of tilt which is substantially transversal with respect to the fuselage, so as to switch between helicopter mode and airplane mode, in which mode the rotors act as propellers, each fixed wing being extended, substantially in the direction of its span and toward the outboard side of the corresponding nacelle with respect to the fuselage, by at least one outboard wing portion, at least part of which pivots, independently of the rotor and of at least the front part of the corresponding nacelle, about an axis of articulation substantially transversal to the aircraft and constitutes an orientable surface which is at least one of a command surface and a control surface, whose pivotings about the axis of articulation are commanded, by at least one driven actuator, the convertible aircraft comprising a self-driven active anti-vibration system with at least one active vibration control computer commanding said at least one driven actuator causing said orientable surface to pivot about said axis of articulation at least at a frequency of the order of KbΩ, where b and Ω are, respectively, the number of blades and the frequency of rotation of each rotor, and K is a whole number at least equal to 1, so as to at least attenuate, at the fuselage, the fixed wings and the empennage and stabilizer, at least the vibrations generated naturally by the rotation of each rotor.

3. The convertible aircraft as claimed in claim 2, wherein said at least one driven actuator transiently commands the pivoting of said orientable surface at a frequency below KbΩ and of the order of 4 to 6 Hz so as to counter the whirl flutter phenomenon.

4. The convertible aircraft as claimed in claim 2, wherein said at least one driven actuator transiently commands the pivoting of said orientable surface at a frequency below KbΩ and, generally of the order of 4 Hz, so as to counter the tail shake phenomenon.

5. The convertible aircraft as claimed in claim 2, wherein said actuator is an excitation ram shaved in movement, maneuvering said orientable surface against the action of static and dynamic tuning elastic means and driven automatically by said at least one active vibration control computer which is self adaptive and drives said ram on the basis of signals received from at least one sensors, including load, accelerometer and gyrometer sensors, arranged at least at one predetermined points on at least one of said fuselage, rotors empennage and stabilizer.

6. The convertible aircraft as claimed in claim 5, wherein the elastic means absorb the static forces of said orientable surface and, in dynamic terms, their stiffness is coupled to the inertia of the moving assembly comprising at least said orientable surface and moving parts of said ram so as to create a second-order resonant system, the resonant frequency of the moving assembly being tuned to the excitation frequency of the ram.

7. The convertible aircraft as claimed in claim 6, wherein said moving assembly has a resonant frequency $$f = \frac{1}{2\pi}\sqrt{\frac{k}{I}},$$

where k is the stiffness of the elastic means and I is the inertia of the moving assembly and the excitation frequency of the ram is no normally tuned to bΩ such that bΩ is substantially equal to f.

8. The convertible aircraft as claimed in claim 7, wherein the two rotors are three-bladed rotors, and the excitation frequency of the ram is normally tuned substantially to a frequency of about 20 Hz.

9. The convertible aircraft as claimed in claim 5, wherein in that the excitation frequency of the ram is transiently tuned to a frequency of about 4 Hz to about 6 Hz when said sensors detect signals that bear witness to at least one of the phenomena of tail shake and whirl flutter and then tuned back substantially to the frequency bΩ.

10. The convertible aircraft as claimed in claim 5, wherein the excitation ram can also be driven by pilot controls.

11. The convertible aircraft as claimed in claim 10, wherein command of the excitation ram by the vibration control computer is neutralized while said excitation ram is being commanded by the pilot controls.

12. The convertible aircraft as claimed in claim 2, wherein said outboard wing portion is an outboard wing part that can entirely pivot about the axis of articulation and constitutes an elevon.

13. The convertible aircraft as claimed in claim 2, wherein said pivoting part of the outboard wing portion is a pivoting trailing edge elevon of a fixed and outboard wing portion.

14. The convertible aircraft as claimed in claim 2, wherein each fixed wing comprises at least one inboard surface which is at least one of a command surface and a control surface between the corresponding nacelle and the fuselage and which pivots about a second axis of articulation substantially transversal to the aircraft.

15. The convertible aircraft as claimed in claim 2, wherein the fixed wings are high wings secured to the upper part of the fuselage.

16. The convertible aircraft as claimed in claim 15, wherein the fixed high wings have an upward dihedral angle between the fuselage and the nacelles.

17. The convertible aircraft as claimed in claim 16, wherein outboard of the nacelles, said outboard wing structure portions also have an upward dihedral angle.

18. The convertible aircraft as claimed in claim 16, wherein outboard of the nacelles, said outboard wing structure portions have a zero dihedral angle.

19. The convertible aircraft as claimed in claim 16, wherein outboard of the nacelles, said outboard wing structure portions have a downward dihedral angle so that the fixed wing structure of the aircraft is substantially in the form of gull wings.

20. The convertible aircraft as claimed in claim 2, wherein the axis of articulation of the pivoting parts, of the outboard wing structure portions (13, 13', 27) is offset forward or blackward from the centers of twist of the fixed wings.

* * * * *